(12) United States Patent
Mülle

(10) Patent No.: US 8,438,827 B2
(45) Date of Patent: May 14, 2013

(54) BLOCK LOCK FOR A ROUND LINK CHAIN

(75) Inventor: Wilhelm Mülle, Fröndenberg (DE)

(73) Assignee: Thiele GmbH & Co. KG, Iserlohn (DE)

( * ) Notice: Subject to any disclaimer, the term of this patent is extended or adjusted under 35 U.S.C. 154(b) by 288 days.

(21) Appl. No.: 12/938,032

(22) Filed: Nov. 2, 2010

(65) Prior Publication Data

US 2011/0099968 A1    May 5, 2011

Related U.S. Application Data

(60) Provisional application No. 61/257,613, filed on Nov. 3, 2009.

(30) Foreign Application Priority Data

Nov. 3, 2009    (DE) ...................... 20 2009 014 963 U

(51) Int. Cl.
    *F16G 15/02*    (2006.01)
(52) U.S. Cl.
    USPC ........................................ 59/85; 59/84; 59/93
(58) Field of Classification Search ................ 59/78, 84, 59/85, 86
    See application file for complete search history.

(56) References Cited

U.S. PATENT DOCUMENTS

| 4,606,188 A | 8/1986 | Osnes et al. | |
| 6,021,634 A * | 2/2000 | Brodziak | 59/85 |
| 6,223,517 B1 * | 5/2001 | Bogdan et al. | 59/85 |
| 7,024,849 B2 * | 4/2006 | Benecke et al. | 59/85 |
| 7,690,183 B2 * | 4/2010 | Mulle | 59/85 |
| 2009/0095035 A1 | 4/2009 | Mülle | |

FOREIGN PATENT DOCUMENTS

| DE | 10 00 193 B | 1/1957 |
| DE | 17 63 212 U | 3/1958 |
| DE | 84 15 008 U1 | 8/1984 |
| DE | 34 29 723 A1 | 3/1985 |
| DE | 298 11 332 U1 | 11/1998 |
| DE | 197 43 025 C1 | 5/1999 |
| DE | 200 08 845 U1 | 10/2000 |
| DE | 20 2006 006 7 | 7/2006 |
| WO | 2007/124713 | * 11/2007 |

OTHER PUBLICATIONS

Search report issued by the German Patent Office on Jul. 5, 2010.

* cited by examiner

*Primary Examiner* — David B Jones
(74) *Attorney, Agent, or Firm* — Henry M. Feiereisen LLC

(57) ABSTRACT

The block lock for round link chains includes two approximately L-shaped lock halves connected with each other by pins. Each lock half has a longitudinal leg with a center rib, which faces away from its continuous back portion and separates bearing shells for chain links, and a cross leg arranged on one end of the longitudinal leg. Projections and receiving pockets are provided on the front ends of the longitudinal legs facing away from the cross legs, and receiving pockets and projections matching the projections and receiving pockets on the longitudinal legs are provided on the sides of the cross legs facing the center ribs. The center ribs are mutually offset in the longitudinal direction of the identically constructed lock halves.

5 Claims, 2 Drawing Sheets

BLOCK LOCK FOR A ROUND LINK CHAIN

CROSS-REFERENCES TO RELATED APPLICATIONS

This application claims the priority of German Patent Application, Serial No. 20 2009 014 963.3, filed Nov. 3, 2009, pursuant to 35 U.S.C. 119(a)-(d), the content of which is incorporated herein by reference in its entirety as if fully set forth herein.

This application claims the benefit of prior filed U.S. provisional Application No. 61/257,613, filed Nov. 3, 2009, pursuant to 35 U.S.C. 119(e), the content of which is incorporated herein by reference in its entirety as if fully set forth herein.

BACKGROUND OF THE INVENTION

The present invention relates to a block lock for a round link chain.

The following discussion of related art is provided to assist the reader in understanding the advantages of the invention, and is not to be construed as an admission that this related art is prior art to this invention.

Some conventional block locks for chains include two approximately L-shaped lock halves connected by pins. Each of the lock halves has a longitudinal leg with a center rib facing away from its continuous back section as well as bearing shells for steel chain links and a cross leg disposed on one end of the longitudinal leg. Projections and receiving pockets are arranged on the end faces of the longitudinal legs that face away from the cross legs, and receiving pockets and projections which match the projections and receiving pockets on the longitudinal legs are arranged on the sides of the cross legs facing the center ribs. The respective projections engage with the corresponding receiving pockets when the link halves are joined after insertion of the end links of two round link chains, thereby locking the link halves with each other. The position of the link halves is secured with a dowel pin which extends transversely through the center ribs of the link halves, meshing in a groove- and spring-like fashion.

Although these conventional block locks have proven successful in practice, potential for improvement still exists in practical applications. These applications relate particularly to underground mining operations, where the round link chains connected by one or several block locks are guided over chain wheels arranged at the ends of the respective equipment (for example, a chain conveyor). When after running over a chain wheel the block locks dip into the region below, a so-called slack chain is formed. The round link chains then no longer experience the tension force exerted by the chain wheels. The end links engaging with the block locks can then strike against the flanks of the center ribs, causing high stress on the dowel pins extending through the center ribs.

It would therefore be desirable and advantageous to address this problem and to obviate other prior art shortcomings by providing a block lock with an improved service life.

SUMMARY OF THE INVENTION

According to one aspect of the present invention, a block lock for round link chains has two approximately L-shaped, identically constructed lock halves connected with each other by pins. Each lock half includes a continuous back portion and a longitudinal leg with a center rib, which faces away from the continuous back portion and separates bearing shells for the chain links, and a cross leg arranged on an end of the longitudinal leg. First projections and first receiving pockets are disposed on an end face of the longitudinal leg facing away from the cross leg, and second receiving pockets and second projections matching the first projections and the first receiving pockets are disposed on sides of the cross leg facing the center rib. The center ribs are mutually offset between the two lock halves in a longitudinal direction of the lock halves.

The offset between the center ribs in the longitudinal direction of the identically formed lock halves creates open spaces adjacent to the center ribs in the region of the bearing shells for the chain links, so that the center ribs are relieved in situations of a slack chain. The room for the chain links to maneuver in the situation of a slack chain is now significantly limited. The free spaces have adequate dimensions so that a chain-link can come into contact with only one of the center ribs, although each of the flanks of the center ribs directly face the chain links. For example, the free space can result from the fact that the flank of the center rib facing the chain link has a greater radius of curvature than the radius of the inserted round chain link. The free space can therefore extend over the entire height of the center rib, i.e., from a longitudinal leg to an end face of the directly opposite center rib. However, the free space can also have the same radius as the outside of the bend of the inserted chain link engaging with the block lock. The free space is then created by an offset with respect to the other center rib in the longitudinal direction of the block lock. The term "radius" is here used in lieu of "arcuate curvature", whereby this does not necessarily refer to an arc of a circle, but rather to a rounded contour with continuous transitions.

Another advantage of the free space is that the inserted chain link only contacts that particular center rib where contact with the chain link supports the closing motion of the lock halves and simultaneously contact with the other center rib is prevented, which in case of contact would support the opening motion of the lock halves.

Also eliminated is the center dowel pin which in the conventional design extends transversely through the center ribs. The problems in the central region of a block lock resulting in fatigue fractures of the connecting means are thereby definitely eliminated.

Advantageously, pins in the lock halves are now arranged in the transition region from the longitudinal legs to the cross legs. Dowel pins are used which are arranged with a quasi-diagonal offset, for example in the gap between the lock halves between a projection and a receiving pocket.

The center ribs preferably abut each other with their end faces. This prevents the block lock from being constricted at the center under tension.

According to another improvement in locking the lock halves, tongue-like projections with mutually parallel end sections are provided on the end faces of the longitudinal legs. The receiving pockets in the cross legs supporting the end sections terminate in the end faces of the lock halves.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
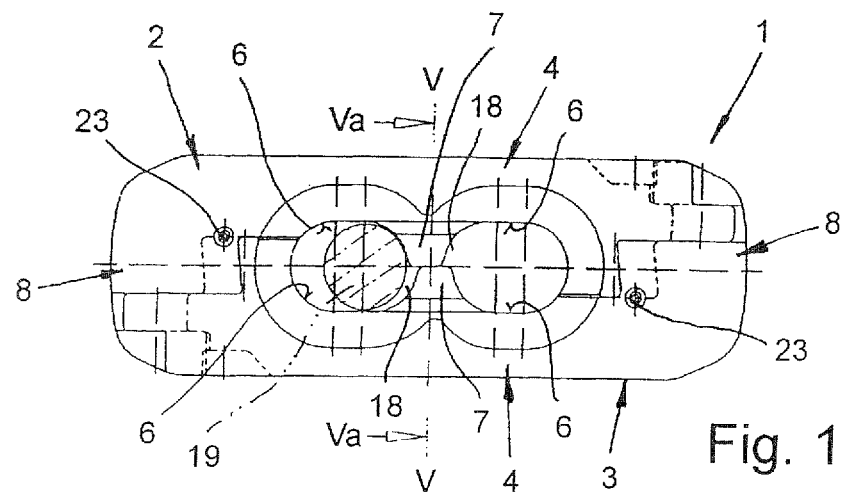
FIG. 1 shows a block lock for a round link chain in a side view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block lock 1 which includes two identical lock halves 2, 3 having an approximately L-shaped configuration. Each of the lock halves 2, 3 has a longitudinal leg 4 with a center rib 7 which faces away from its continuous back portion 5 and separates bearing shells 6 for chain end links of the round link chains, and a cross leg 8 arranged on one end of the longitudinal leg 4.

Figure 2:
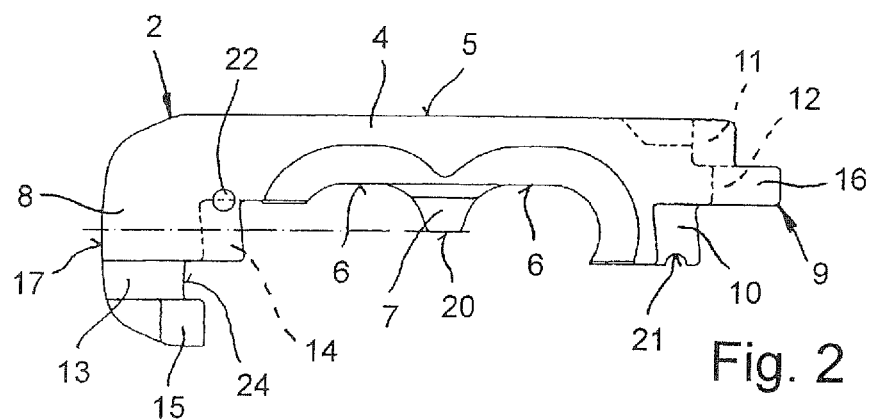
FIG. 2 shows a lock half of the block lock of FIG. 1 in a side view.
Figure 3:
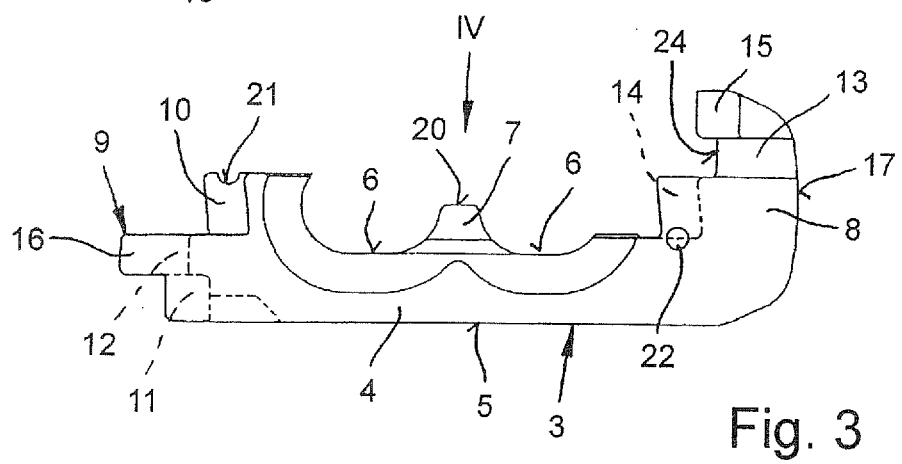
FIG. 3 shows the corresponding lock half in a side view.
Figure 4:
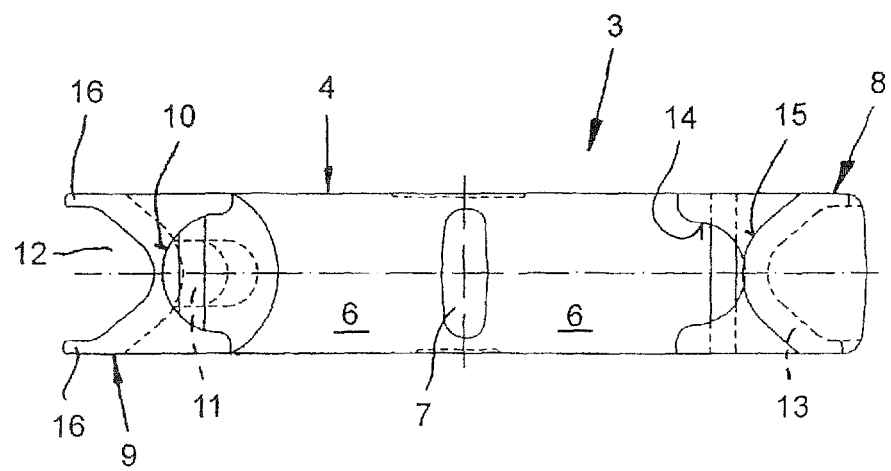
FIG. 4 shows a top view of the lock half of FIG. 3, as viewed in the direction of arrow IV.
Figure 5:
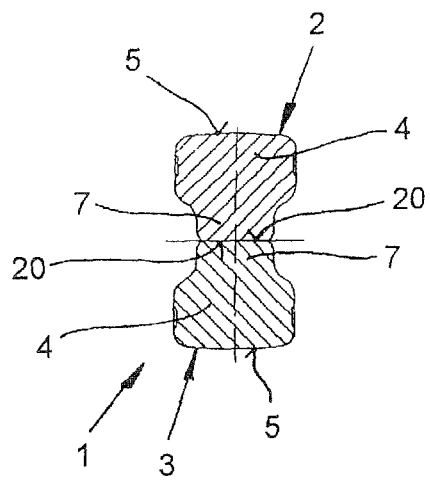
FIG. 5 shows a vertical cross-section through the illustration in FIG. 1, taken along the line V-V, as viewed in the direction of the arrows Va.

Tongue-like projections 9 and toe-like projections 10 as well as receiving pockets 11, 12 are arranged on the front ends of the longitudinal legs 4 that face away from the cross legs 8. Receiving pockets 13, 14, which match the tongue- and toe-like projections 9, 10, and projections 15, 24, which match the receiving pockets 11, 12 on the front ends of the longitudinal legs 4, are arranged on the sides of the cross legs 8 facing the center ribs 7. With these projections 9, 10, 15, 24 and receiving pockets 11, 12, 13, 14, the lock halves 2, 3 according to FIGS. 2 and 3 can be locked with each other to form the block lock 1.

The tongue-like projections 9 on the front ends of the longitudinal legs 4 are provided with mutually parallel end sections 16. The receiving pockets 13 in the cross legs 8 which support these end sections 16 terminate in the end faces 17 of the lock halves 2, 3.

As seen in FIG. 1, the center ribs 7 of the lock halves 2, 3 are mutually offset in the longitudinal direction of the lock halves 2, 3. Due to this offset, diagonally opposed free spaces 18 are formed, so that in a so-called slack chain situation of the round link chains, the end links 19 of the round link chains (the end link 19 is indicated in FIG. 1) contact the corresponding center ribs 7, preventing them from simultaneously striking both center ribs 7.

The end faces 20 of the center ribs 7 nevertheless abut and support each other. This prevents constriction of the block lock 1 when tension is applied by the round link chains.

With respect to their flanks, the identically configured center ribs 7 are identical on both sides for delimiting/forming the bearing shells 6, i.e., configured mirror-symmetrically. As a result, the free space 18 is lowest in the region of the end faces 20 in the longitudinal direction of the block lock 1, with the depth decreasing in the direction of the longitudinal legs 4. The free spaces 18 are therefore sickle-shaped. Even if the radii of the flanks were not different with a symmetrical structure of the flanks of the center ribs 7, the offset of the center ribs 7 in the longitudinal direction ensures that a round chain-link can always come into contact with only a single flank of one of the two center ribs 7 delimiting the bearing shell.

As also seen particularly in FIG. 1, the lock halves 2, 3 are connected by pins in the region of the transitions from the longitudinal legs 4 to the transverse legs 8. To this end, grooves 21 are arranged on the longitudinal legs and bores 22 on the transverse legs 8, through which dowel pins 23 shown in FIG. 1 can be driven, which hold the lock halves 2, 3 together.

Block locks made from steel for steel round link chains are primarily employed in underground mining operations in a chain conveyor having chain wheels disposed at its ends.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A block lock for a round link chain, comprising:
   two approximately L-shaped identical lock halves connected with one another by pins, each lock half including
      a longitudinal leg having a continuous back portion and having one end formed with a projection and a receiving pocket,
      a center rib arranged distal to the back portion and separating bearing shells for chain links from one another, and
      a cross leg arranged on another end of the longitudinal leg and formed with a projection and a receiving pocket which are arranged in confronting relationship to the center rib and complement the projection and the receiving pocket of the longitudinal leg,
   wherein the center rib of the longitudinal leg of one of the lock halves and the center rib of the longitudinal leg of the other one of the lock halves are arranged in offset relationship to form diagonally opposed free spaces sized to enable end links of the round link chain to rest against the center ribs when the round link chain is slack.

2. The block lock of claim 1, wherein the center rib of the longitudinal leg of the one of the lock halves and the center rib of the longitudinal leg of the other one of the lock halves have abutting end faces.

3. The block lock of claim 2, wherein the pins to connect the lock halves are arranged in a transition region from the longitudinal leg to the cross leg.

4. The block lock of claim 1, wherein the pins to connect the lock halves are arranged in a transition region from the longitudinal leg to the cross leg.

5. The block lock of claim 1, wherein the projection of the longitudinal leg is tongue-shaped and has end sections in parallel relationship, said receiving pocket of the cross leg supporting the end sections and terminating in an end face of the lock half.

* * * * *